United States Patent

Gorman

[11] 3,894,851
[45] July 15, 1975

[54] REMOVAL OF PARTICULATE MATTER WITH SUPERSONIC DROPLETS

[75] Inventor: Paul G. Gorman, Prairie Village, Kans.

[73] Assignee: Midwest Research Institute, Kansas City, Mo.

[22] Filed: Feb. 7, 1972

[21] Appl. No.: 223,956

[52] U.S. Cl. .......... 55/94; 55/92; 55/263; 55/277; 261/16; 261/118; 261/DIG. 9
[51] Int. Cl. .......... B01d 51/10; B01d 47/06
[58] Field of Search .......... 55/15, 23, 25, 30, 57, 55/97, 263, 264, 277, 235, 237, 238, 261, 263, 223, 266, 346, 83, DIG. 25, 94.92; 261/DIG. 9, 116, DIG. 54, 115, 16, 118

[56] References Cited
UNITED STATES PATENTS

| | | | |
|---|---|---|---|
| 1,563,125 | 11/1925 | Ward | 55/263 X |
| 2,579,282 | 12/1951 | Vicard | 261/DIG. 054 |
| 2,604,185 | 7/1952 | Johnstone et al. | 55/238 X |
| 3,139,331 | 6/1964 | Boudreau | 55/237 |
| 3,385,030 | 5/1968 | Letvin | 261/DIG. 054 |
| 3,467,121 | 9/1969 | Bowles | 55/257 X |
| 3,613,333 | 10/1971 | Gardenier | 55/223 X |
| 3,706,538 | 12/1972 | Chew | 261/DIG. 054 |

FOREIGN PATENTS OR APPLICATIONS

| | | | |
|---|---|---|---|
| 686,779 | 1/1953 | United Kingdom | 55/DIG. 25 |

OTHER PUBLICATIONS
"Chemical Engineer's Handbook," J. H. Perry, McGraw Hill publishers 1950, page 811.

*Primary Examiner*—Frank W. Lutter
*Assistant Examiner*—Neil F. Greenblum
*Attorney, Agent, or Firm*—D. A. N. Chase

[57] ABSTRACT

Water droplets traveling at supersonic velocities are utilized to remove particulate matter from a gas stream in which the matter is entrained. The gas stream, such as an industrial effluent containing particulate contaminants, flows through a duct at a relatively low velocity. The outlet of a converging-diverging nozzle communicates with the duct at a mixing region thereof, and steam under pressure at subsonic velocity is supplied to the inlet of the nozzle. The steam reaches sonic velocity in the throat of the nozzle, is accelerated to supersonic velocity in the diverging section of the nozzle, and undergoes isentropic (or essentially isentropic) expansion to cause partial condensation, resulting in the formation of droplets of a size on the order of 0.1 micron. These supersonic droplets are injected into the duct and combine with the contaminants to thereby increase the size of particles carried by the gas stream downstream from the mixing region. A cyclone separator is located downstream to separate the particles of increased size from the gas stream.

7 Claims, 2 Drawing Figures

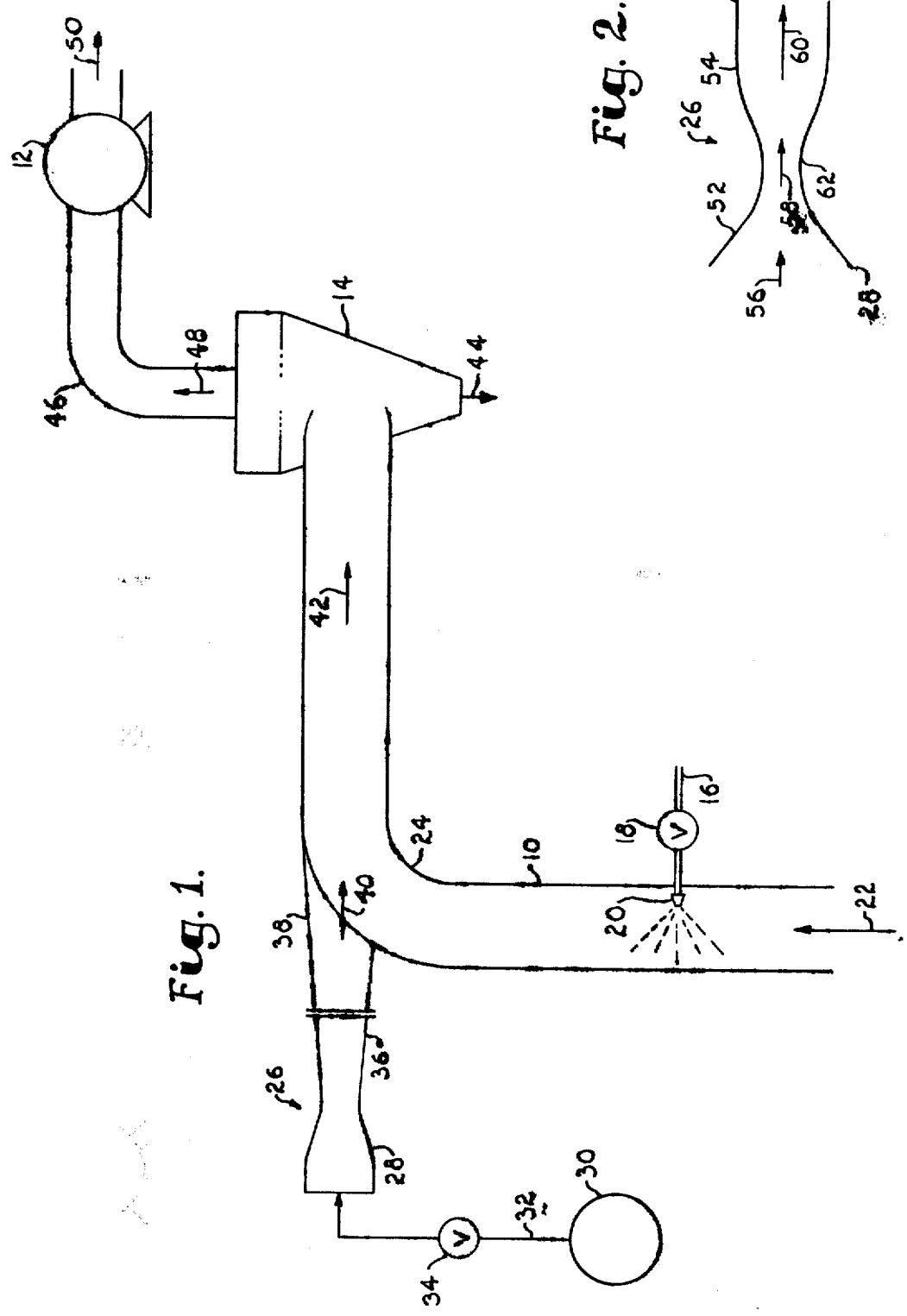

REMOVAL OF PARTICULATE MATTER WITH SUPERSONIC DROPLETS

The invention described herein was made in the course of work under a grant or award from the Department of Health, Education, and Welfare.

This invention relates to improvements in methods and apparatus for removing particulate matter from a gas stream and, more particularly, to the removal of such matter by the injection of water droplets of preferably submicron size traveling at supersonic velocities into a duct carrying the gas stream containing entrained particulate matter.

Various types of low and high pressure drop wet scrubbers have been proposed and are in use in the removal of particulate matter entrained in a gas stream. One important usage of wet scrubbers, of course, is in the collection of particulate contaminants contained in industrial effluents prior to discharging the effluent into the atmosphere. One system of particle removal and collection employs a Venturi scrubber which, although reasonably efficient in particle removal, requires a significant amount of power for operation due to the high pressure drop through the Venturi.

It has been found that the efficiency of wet scrubbers is enhanced by increasing the velocity difference between the water droplets and the particulate matter to be removed, and further by decreasing the size of the droplets. It is believed that droplets having diameters on the order of 0.1 micron are optimum for the purpose of collecting particulate matter entrained in a gas stream. However, existing wet scrubber systems do not produce quantities of droplets in the submicron range, thus the increased collection efficiency to be realized by this droplet size is not obtained in practice.

With respect to existing means of providing a velocity difference between the scrubbing droplets and the particulate matter to be collected, the Venturi scrubber achieves the velocity differential by accelerating the gas stream prior to introducing the stream to the Venturi section. A water stream is injected at the throat of the Venturi and is broken into droplets by the high velocity gas stream. Although it is evident that a high velocity differential is produced since the water is not injected at high velocity, nonetheless the velocity of the gas stream is inherently limited to the subsonic range. Furthermore, since the entire gas stream containing the particles to be collected must be accelerated in a duct, substantial power is consumed by blowers that must be employed to accelerate the stream and maintain the flow through the Venturi section.

It is, therefore, the primary object of the present invention to provide a method and apparatus for removing particulate matter from a gas stream, wherein the velocity difference between the gas stream and the water droplets is not limited to the sonic range, and wherein quantities of droplets of submicron size are produced.

Another important object of this invention is to provide a mehtod and apparatus as aforesaid in which relatively low power is required to produce the high velocity differential.

As a corollary to the foregoing objects, it is an important aim of this invention to provide a method and apparatus as aforesaid in which water droplets traveling at supersonic velocities are employed and enter a relatively slow moving gas stream from which it is desired to remove particulate matter entrained therein.

Furthermore, it is a specific and important object of the present invention to provide a method and apparatus as aforesaid in which the small, supersonic droplets are produced by the action of steam in isentropic flow through a converging-diverging nozzle whereby, through isentropic expansion in the diverging section of the nozzle, partial condensation occurs to form the submicron droplets traveling at supersonic velocities. In the drawings:

FIG. 1 is a diagrammatic illustration of an exemplary apparatus for practicing the teachings of the present invention; and FIG. 2 is a diagrammatic view of the converging-diverging nozzle illustrating the action of the nozzle in producing supersonic droplets.

Referring to FIG. 1, a duct 10 is shown for conveying a gas stream from a source (not illustrated) to ultimate discharge to atmosphere as the exhaust of a blower 12. The apparauts of the present invention is incorporated with the duct 10 to treat the gas stream prior to flow thereof into a cyclone separator 14. Water is supplied by a pipe 16 which is valved at 18 and terminates at a spray head 20 inside the duct 10. The gas stream prior to treatment is illustrated by the arrow 22 upstream from the spray head 20 and from an elbow 24 in the duct 10.

A converging-diverging nozzle 26 has an inlet 28 which is supplied with steam generated by a boiler 30. The steam line 32 is valved at 34 and is capable of delivering steam under moderate pressure (such as 100 p.s.i.g.) to the inlet 28. The nozzle 26 has an outlet 36 which is communicated with the duct 10 by a duct extension 38 which merges with the outside of the elbow 24. As will be discussed fully hereinafter, supersonic steam and condensed droplets are injected into the duct 10 at the elbow 24 as illustrated by the arrow 40 and in the direction indicated. The arrow 42 downstream from the elbow 24 represents the gas stream after treatment and prior to entering the intake of the cyclone 14. Heavy particles in the gas stream collected by the cyclone 14 are discharged therefrom as indicated by the arrow 44, and the clean gas is discharged into a stack 46 for flow to atmosphere. The blower 12 is interposed in the stack 46 with its intake side facing the cyclone 14 as is evident by the arrows 48 and 50 representing the flow of the clean gas to atmosphere (or to another point of use, as the case may be). The blower 12 may comprise a conventional induced draft fan of sufficient capacity to pull the gases through the duct system.

The converging-diverging nozzle 26 is shown in detail in FIG. 2 where it may be seen that the converging section 52 presents the inlet 28 and the diverging section 54 presents the outlet 36. Three arrows 56, 58 and 60 of progressively increasing length represent the flow of the steam through the nozzle 26. The first arrow 56 represents flow at subsonic velocity in the converging section 52; the second arrow 58 represents the flow at the throat 62 where the velocity of the steam reaches Mach 1; and the arrow 60 illustrates the steam and condensate mixture accelerated to supersonic velocity in the diverging section 54.

SYSTEM OPERATION

Before proceeding with a discussion of the overall system illustrated in FIG. 1 and described above, it is first instructive to note the action of the converging-diverging nozzle 26 illustrated in detail in FIG. 2. As mentioned above, steam from the boiler 30 is supplied to the converging section 52 at subsonic velocity. Moderate initial steam pressure on the order of 100 p.s.i.g. is adequate at the inlet 28. The nozzle 26 and the duct extension 38 are designed to minimize turbulence and provide for isentropic flow (or essentially isentropic flow) of the steam through the nozzle 26 from the inlet 28 to the outlet 36. With the back pressure imposed at the outlet 36 reduced to a low value on the order of atmospheric pressure, acceleration of the steam occurs as it flows through the nozzle 26 by the usual action of the converging-diverging configuration and its intervening throat 62. The steam reaches Mach 1 in throat 62 and is then further accelerated in the diverging section 54 to velocities on the order of Mach 2 or 3. Simultaneously, isentropic expansion of steam in the diverging section 54 causes partial condensation of the steam to occur to thereby form water droplets which are also moving at supersonic speeds. These droplets after formation have diameters on the order of 0.1 micron. An initial steam pressure of 100 p.s.i.g. at the inlet 28 produces approximately 10% condensation for ideal isentropic expansion to atmospheric pressure.

Now referring to FIG. 1, it may be seen that the gas stream to be treated indicated by the arrow 22 first passes a water spray emanating from the spray head 20. It is to be understood that sufficient spray heads would be provided to effect saturation of the gas stream (bring the water vapor content of the gas stream to the dew point). The purpose of saturating the gas stream is to inhibit revaporization of the water droplets that will enter the gas stream at the elbow 24 downstream from the spray head 20. The elbow 24 constitutes a mixing region in the duct 10 where the droplets from the nozzle 26 are injected into the duct and enter the gas stream as depicted by the arrow 40. In this connection, it may be noted that the water droplets are injected into the gas stream in substantially the same direction of flow as the direction of flow of the stream as it completes the 90° turn at the elbow 24.

The blower 12 induces a draft in the duct 10 sufficient to move the gas stream therethrough, but any significant stream velocity is unnecessary other than that required to handle the quantity of gases. Accordingly, the velocity differential between the particulate matter entrained in the gas stream and the injected water droplets is supersonic and is essentially the same as the speed of the droplets themselves. Being principally of submicron size, a large number of droplets are present per unit volume to further enhance the collection efficiency of the system. It is believed that growth of the droplets after leaving the nozzle 26 is primarily by impingement on the particulate matter carried by the gas stream and through collision of droplets. This would appear to be the primary collection mechanism although other mechanisms of collection such as diffusion and electrostatic attraction may also contribute to the combining of the droplets and the particulate matter.

Although the foregoing discussion has assumed a droplet size on the order of 0.1 micron, it should be understood that droplets in the submicron range from approximately 0.01 micron to 1 micron are also effective collectors and may exist in the steam-droplet stream flowing into the duct 10. Additionally, through collision after initial nucleation, droplets on up to sizes of approximately 100 microns may be present and are also useful collectors although the submicron droplets are believed to be the primary collectors of the system.

In the treatment of industrial effluents the particulate contaminants of submicron size are very difficult to collect and are of greatest concern since they tend to stay suspended in the atmosphere and are a prime factor in decreased visibility, smog and physiological effects. Particles less than 5 microns in size are difficult to collect under the action of the centrifugal force of a conventional cyclone. Accordingly, for highest collection efficiency, it is necessary for the particles to "grow" to well over a micron in size, preferably 10 to 100 microns. The method and apparatus of the present invention are especially directed to this problem of submicron contaminants, and are capable of collecting such contaminants by virtue of the small droplet size and very high velocity differential discussed above.

In some instances, efficient collection may be attainable without saturating the gas stream prior to introducing the steam into the mixing region of the duct 10. Although the water droplets from the nozzle 26 would be subject to evaporation, the cohesive properties of the particulate matter are believed to be such that the evaporation of the water from the collected matter would produce agglomerated particles of larger size.

Having thus described the invention what is claimed as new and desired to be secured by Letters Patent is:

1. A method of removing particulate matter from a gas stream in which said matter is entrained, said method comprising the steps of:
    effecting flow of said gas stream through a duct at a relatively low velocity;
    introducing steam to the inlet of a converging-diverging nozzle at a pressure sufficient to cause acceleration of the steam to sonic velocity in the throat of the nozzle, and further acceleration in the diverging section to supersonic velocity along with substantially isentropic expansion of the steam to cause partial condensation thereof to thereby form water droplets of a size less than 100 microns;
    injecting said water droplets traveling at said velocities into said duct at a mixing region thereof to cause the droplets and the particulate matter to combine, whereby to increase the size of particles carried by the stream downstream from said region; and
    downstream from said region, separating said particles of increased size from the gas stream.

2. The method as claimed in claim 1, wherein said droplets are of a size in the submicron range from approximately 0.01 micron to 1 micron.

3. The method as claimed in claim 2, wherein the step of injecting said droplets into said duct includes directing a stream of said droplets into the gas stream to impinge the droplets on the particulate matter therein.

4. The method as claimed in claim 3, wherein said stream of droplets are directed into the gas stream in substantially the same direction of flow as the direction of flow of the gas stream.

5. The method as claimed in claim 1, wherein said droplets are of a size on the order of 0.1 micron.

6. The method as claimed in claim 1, wherein is provided the step of saturating said gas stream upstream from said region.

7. The method as claimed in claim 1, wherein said supersonic velocity is on the order of Mach 2 or 3.

* * * * *

UNITED STATES PATENT OFFICE
CERTIFICATE OF CORRECTION

PATENT NO. : 3,894,851

DATED : July 15, 1975

INVENTOR(S) : PAUL G. GORMAN

It is certified that error appears in the above-identified patent and that said Letters Patent are hereby corrected as shown below:

Column 4,
Claim 1, lines 42 and 43, change "velocities" to --velocity--.

Signed and Sealed this eleventh Day of November 1975

[SEAL]

Attest:

RUTH C. MASON
Attesting Officer

C. MARSHALL DANN
Commissioner of Patents and Trademarks